United States Patent [19]

Dyson et al.

[11] 4,350,713
[45] Sep. 21, 1982

[54] PRODUCTION OF SPONGE CAKE

[75] Inventors: David V. Dyson, Richmond Hill; David H. Lees, Bolton; Michael A. F. Fenn, Ajax; Kenneth S. Darley, Whitby, all of Canada

[73] Assignee: The Griffith Laboratories, Limited, Scarborough, Canada

[21] Appl. No.: 244,247

[22] Filed: Mar. 16, 1981

[51] Int. Cl.$^3$ ............................................. A21D 8/00
[52] U.S. Cl. ................................... 426/243; 426/552
[58] Field of Search ............................. 426/241–244, 426/552–555, 498

[56] References Cited

U.S. PATENT DOCUMENTS 3,041,176  6/1962  Baker .................................. 426/498
3,459,560  8/1969  Shea ................................... 426/519
3,615,683  10/1971 Hoynak ............................... 426/241
4,218,480  8/1980  Dyson et al. ........................ 426/498

OTHER PUBLICATIONS

Copson, Microwave Heating, Avi Publishing Co. In., Conn. 1962, pp. 381–382.

Primary Examiner—Raymond N. Jones
Assistant Examiner—Elizabeth A. Hatcher
Attorney, Agent, or Firm—Sim & McBurney

[57] ABSTRACT

Sponge cake is formed by the utilization of a continuous process involving an initial batter formation and subsequent microwave baking. Cake-forming components and carbon dioxide are continuously mixed to form a gas-infused batter. Microwave energy expands and cooks the batter to form the sponge cake. Additional drying may be effected to any desired moisture level.

16 Claims, No Drawings

PRODUCTION OF SPONGE CAKE

FIELD OF INVENTION

The present invention relates to a continuous procedure for the manufacture of sponge cake.

BACKGROUND TO THE INVENTION

Sponge cake is traditionally made by forming a batter containing flour, sugar, eggs and water, along with baking powder to provide leavening and any desired flavouring agents, and baking the batter in an infra-red radiation oven. Such procedures require time to effect leavening. Further, the proportions of ingredients are critical to achieving the required texture. In addition, the baking procedure often forms a hard crust on the cake, which can lead to undesirably hard particles and crust coloration in a comminuted mixture, when the cake is to be used in crumb form.

SUMMARY OF INVENTION

The present invention overcomes the prior art problems and enables sponge cake with characteristics comparable to sponge cake made by conventional methods to be formed continuously without the necessity for a long leavening time, without the development of crust and with considerable flexibility of the proportion of ingredients. The present invention involves the utilization of a unique batter mixing procedure and microwave baking of the batter under controlled conditions.

In the process of the present invention, sponge cake is formed by a multistage substantially continuous procedure, which comprises continuous mixing of cake-making components to form a gas-infused batter, and thereafter expanding and cooking the batter under the application of microwave energy to form a baked sponge cake.

GENERAL DESCRIPTION OF INVENTION

The sponge cake which is produced by the process of this invention has characteristics comparable to those of conventional sponge cake, except that no crust is formed on the surface thereof. The absence of such crust avoids the presence of hard particles and crust coloration in the particulate form which results from comminution of the sponge cake, and this is quite desirable in many applications of the comminuted cake.

The comminuted cake crumbs may have any desired particle size, depending on the end use. The density, resulting in part from the porosity of the cake and in part from the size of the individual particles, ranges from about 0.2 to about 0.4 g/cc (12.5 to 25 lb/cu.ft.) and the shear value ranges from about 8 to about 25 kg.

The initial cake-forming ingredients may include any of those conventionally used in cake making, including water, flour, eggs and sugar. The term "flour" as used herein usually refers to a soft wheat flour, but includes any combination of wheat flours, including those known as cake or high ratio cake flours.

Varying quantities of cake-forming components may be used and the procedure of the invention enables less critical proportions of ingredients, to be utilized than is the case in conventional cake-making procedures, particularly additive components, such as, emulsifying agents and surfactants which are conventionally employed to improve the functional properties of the major components and to effect cost reductions with improvements in keeping quality from a staling or onset of undue firmness standpoint.

In addition to the basic cake-forming components, salt, flavouring agents, such as, vanilla and cocoa, and colouring agents usually are used. Baking powder, which is conventionally used along with entrained gas to provide the total leavening of the cake, is not required, since leavening is achieved by the generation of steam in the microwave baking step along with gas expansion. Some baking powder may be used, however, to enhance the steam leavening.

The cake-forming components may be provided in the form of a dry mix containing sugar and flour and a wet mix containing egg and water. One suitable dry mix comprises:

| | |
|---|---|
| Sugar | about 40 to about 60 parts by weight |
| Flour | about 40 to about 60 parts by weight |
| Sugar and Flour | 100 parts by weight. |

In addition, one or more of the following optional components may be added:

| | |
|---|---|
| Baking powder | 0 to about 2.0 parts by weight |
| Salt | 0 to about 1.5 parts by weight, typically about 0.5 to about 1.5 parts by weight |
| Cocoa | 0 to about 15 parts by weight, typically about 9.5 to about 15 parts by weight |

One suitable wet mix comprises:
Liquid egg: 100 parts by weight.
Liquid egg has a high moisture content typically about 74 wt.%, and this moisture provides part of the moisture requirement for the batter.

An optional component which may be present in the wet mix is:
Vanilla extract: 0 to about 2% by weight of the egg In the process of the invention, the cake-forming components are fed to inlets at one end of a continuous mixing zone capable of plug flow therethrough. The mixing zone may take the form of an elongate, screw-type mixer-extruder, suitably modified to provide the required processing conditions therein.

The dry mix, wet mix and additional water are separately metered to one end of the mixing zone in proportions suitable to provide an overall moisture content of intermixed components of about 20 to about 45% by weight, preferably about 28 to about 38% by weight.

Within the mixing zone, the cake-forming components are continuously intermixed while they are conveyed from the end of the mixing zone to the other, over a time period of about 20 to about 180 seconds, preferably about 30 to 60 seconds.

A plurality of spaced gaseous inlets may be provided along the length of the mixing zone and a gaseous material, or mixture of gaseous materials, is injected into the mix through the openings. The gaseous material usually is carbon dioxide, often in admixture with nitrogen, although other materials, including air and oxygen, may be used. When utilized, the total gas fed to the mixing zone is in the range of about 1.3 to about 18 SCF, preferably about 4.4 to about 7 SCF, per 100 lb. of cake-forming components.

The addition of gas in this way generally decreases the density and increases the shear value of the product obtained. In the absence of gas deliberately added in this way, there is always some entrained gas in the batter.

The cake-forming components and the entrained gas, together with any injected gas, are subjected to shear forces within the mixing zone, sufficient to cause simultaneous uniform mixing of the components and dispersion of the gas throughout the mix. The work done on the batter within the mixing zone varies from about 4 to about 7 watt hr/lb. of batter, preferably about 5 to 6 watt hr/lb.

The temperature within the mixing zone is controlled at a desired value, but the value is not critical to the process and heat generally is not used. The temperature generally corresponds to the inlet ambient temperature of the water and liquid egg, which may vary widely, depending on the time of the year, typically from about 5° to about 25° C. (about 40° F. to about 80° F.). The batter which results from the operations in the mixing zone is extruded therefrom under a low back pressure of about 10 to about 75 psig, preferably about 20 to about 50 psig.

The operations which are effected in the mixing zone result in the continuous extrusion of a uniformly-mixed gas-infused foaming batter having a density from about 0.65 to about 0.95 g/cc and a moisture content corresponding to that fed to the mixing zone.

The sugar which may be used in the cake-forming components in this invention includes crystalline sugar and liquid sugar, including those syrups derived from corn or other starches, or a combination of such sweeteners. In conventional cake batter-making operations, the crystalline form of sugar is required, since the abrasive nature of the sugar crystals breaks up the egg and enables it to be evenly distributed throughout the batter, and mixing is effected to dissolve the sugar.

In this invention, the action of crystalline sugar is not relied on to distribute the egg and it has been found that the mixing which occurs in the mixing zone in this invention results in solid phase sugar being present in the batter, when crystalline sugar is used as the source of sugar. Liquid sugars normally cannot be used, for the above reason, but may be used in this invention to provide texture improvements not readily achieved by conventional mixers, and improvements in keeping times by delaying the onset of staling or firming and provide the option to use the most economical sweetener blend.

The batter, extruded from the mixing zone then enters a microwave baking oven, usually in the form of a long tunnel through which the batter is conveyed in a continuous fashion. The microwave energy causes the water in the batter to be rapidly heated to produce steam which expands and cooks the cake. The dissolved gaseous material also expands, and any leavening agent present, is activated.

The microwave baking is effected at an energy input of from about 3 to about 12 kw min/lb. of batter, preferably about 4 to about 8 kw min/lb. of batter, for a time sufficient to raise the temperature to about 180° to 230° F., preferably about 200° to about 212° F., and to result in a moisture loss of about 10 to about 23 wt.%. An air stream, which may be of ambient temperature or higher, is passed through the microwave oven to remove generated steam.

The sponge cake which results from the microwave baking step is fully cooked but relatively moist at a moisture level of about 12 to about 33 wt.%. The cake may be dried to a desired moisture level, usually about 3 to about 8 wt.% in any convenient manner, including continued application of microwave energy, and, if to be used in a comminuted form, such as, in pudding mixes, then comminuted to sponge cake crumbs of any desired particle size. The cake crumbs have a density from about 0.2 to about 0.4 g/cc and a shear value of about 8 to about 25 kg.

The continuous procedure of the invention, therefore, comprises essentially two steps, namely batter mixing and microwave baking. The result is a sponge cake of properties corresponding to those formed by conventional baking, but produced in a continuous manner.

EXAMPLES

Example 1

This Example illustrates the formation of a vanilla sponge cake by two separate procedures, one involving the addition of gas and the other wherein gas addition is omitted.

An initial dry mix containing the following ingredients was prepared:

| Component | Parts by Weight |
|---|---|
| Flour | 46.7 |
| Salt | 1.0 |
| Baking powder | 1.1 |
| Sugar | 50.5 |
| Myvaplex 600* | 0.7 |
| | 100.0 |

*Monoglyceride emulsifier sold by Eastman Chemical Products Inc.

An initial wet mix was also prepared, containing the following ingredients:

| | |
|---|---|
| Liquid whole egg (74% moisture) | 98.9 |
| Colour | 0.2 |
| Vanilla | 0.9 |
| | 100.0 |

The dry mix, wet mix and water were fed into one end of an extruder at the following flow rates:

| | |
|---|---|
| Dry mix | 8.75 parts/min |
| Wet mix | 4.46 parts/min |
| Water | 0.68 parts/min |

These flow rates correspond to a moisture content of 32%.

The components were continuously intermixed during passage from one end of the extruder to the other in about 35 seconds. In one run, carbon dioxide was fed into the extruder at six different locations along the length of the extruder at a rate of 5.75 SCF/100 lb. of batter whereas in another run no gas feed was employed. Work of 5 watt hr/lb. of batter was applied to the batter during formation thereof and passage through the extrusion and a back pressure of 35 psig exited at the extruder outlet orifice.

A gas-infused evenly-mixed batter of temperature 54.5° F. was extruded from the extruder and fed directly into a continuous microwave oven wherein the batter was subjected to microwave energy at an energy input of 4.75 kw min/lb. of batter as it passed through the oven in 150 seconds. A flow of air at ambient temperature was passed through the oven to remove moisture.

The microwave baking was effected to result in a moisture loss of 14.5% by weight (to 20.4 wt.%) and an internal temperature of 212° F.

The resulting sponge cake was dried to a moisture level of 5 wt.% and cut into convenient lengths. The samples from the two runs exhibited the following properties:

|  | With gas addition | No gas addition |
|---|---|---|
| Density (g/cc) | 0.29 | 0.35 |
| Shear (kg) | 21 | 11 |

It will be seen from these results that the addition of the gas decreases the density of the product while increasing the shear value thereof.

Example 2

This Example illustrates the formation of a chocolate sponge cake.

The procedure of Example 1 was generally repeated using the following components to form the batter.

| Dry mix | |
|---|---|
| Sugar | 50.22 |
| Flour | 36.31 |
| Salt | 0.99 |
| Baking powder | 1.34 |
| Sodium bicarbonate | 0.32 |
| Cocoa | 10.82 |
| | 100.00 |
| Wet mix | |
| Liquid whole egg | 99.16 |
| Vanilla | 0.84 |
| | 100.00 |
| Feed rates | |
| Dry mix | 8.848 parts/min |
| Wet mix | 4.350 parts/min |
| Water | 0.68 parts/min. |

The batter had a moisture content of 33 wt.% and a temperature of 56° F. Microwave baking was effected as follows:

| Energy used | 5.88 kw min/lb. of batter |
|---|---|
| Temperature rise | to 212° F. |
| Moisture loss | 21.7 wt. % (to 14.4 wt. %) |

After drying to 5 wt.% moisture, the sponge cake had a density of 0.29 g/cc and a shear value of 13 kg.

Example 3

This Example illustrates the formation of a vanilla sponge cake wherein baking powder is completely absent.

The procedure of Example 1 was again repeated using the following components to form the batter:

| Dry mix | |
|---|---|
| Sugar | 51.233 |
| Flour | 57.759 |
| Salt | 1.008 |
| | 100.000 |
| Wet mix | |
| Liquid whole egg | 99.09 |
| Vanilla | 0.91 |
| | 100.00 |

| Feed rates | |
|---|---|
| Dry mix | 8.75 kg/min |
| Wet mix | 4.375 kg/min |
| Water | 1.04 kg/min |

The batter had a moisture content of 34 wt.% and a temperature of 57° F. The batter was subjected to microwave baking under the following conditions:

| Energy used | 7.45 kw min/lb. |
|---|---|
| Temperature rise | to 219° F. |
| Moisture loss | 21 wt. % (to 16.4 wt. %) |

After drying to 5% moisture content, the sponge cake had a density of 0.28 g/cc and a shear value of 12 kg.

SUMMARY OF DISCLOSURE

In summary of this disclosure, the present invention provides a unique procedure for the baking of sponge cake, by using steam generation for leavening, microwave energy for cooking and continuous operation. Modifications are possible within the scope of the invention.

What we claim is:

1. A continuous process for manufacture of sponge cake, which comprises:
   feeding cake-forming components including flour, sugar, egg and water to a continuous mixing zone in quantities such that the total quantity of moisture in the cake-forming components is about 20 to about 45% by weight,
   advancing the cake-forming components in plug flow manner through said mixing zone in about 20 to about 180 seconds,
   subjecting said cake-forming components to conditions of shear within said mixing zone such that the work done on the materials within the mixing zone varies from about 4 to about 7 watt hr/lb. of cake-forming components to cause mixing of said components,
   subjecting said cake-forming components to a back pressure within said mixing zone of about 10 to about 75 psig,
   extruding from said mixing zone a cake-forming batter mix of density from about 0.65 to about 0.95 g/cc,
   substantially immediately after said extrusion, baking said extruded batter mix in a microwave baking zone using microwave radiation at an input of about 3 to about 12 kw min/lb. of batter while passing air through said zone to remove generated steam, and
   maintaining said batter in said zone for a time sufficient to result in a baked sponge cake having an internal temperature of about 180° to about 230° F. and to effect a loss of moisture of about 10 to about 23 wt.%.

2. The process of claim 1 wherein said moisture content in the mixing zone is about 28 to about 38% by weight 3. The process of claim 1 wherein said cake-forming components are advanced through the mixing zone in about 30 to 60 seconds.

4. The process of claim 1 including introducing at least one gas to said cake-forming components at a plurality of locations during passage of said components through said zones at a gas flow rate of about 1.3 to about 18 SCF/100 lb. of cake-forming components.

5. The process of claim 4 wherein said gas feed is about 4.4 to about 7 SCF per 100 lb. of cake-forming components.

6. The process of claim 4 wherein said moisture content is about 28 to about 38% by weight, said cake-forming components are advanced through the mixing zone in about 30 to 60 seconds and said gas feed is about 4.4 to about 7 SCF per 100 lb. of cake-forming components.

7. The process of claim 6, wherein said back pressure is about 20 to about 50 psig and said work done is about 5 to 6 watt hr/lb. of cake-forming components.

8. The process of claim 1, 6 or 7 wherein said mixing zone has a temperature corresponding to the ambient temperature of said water in the range of about 40° to about 80° F.

9. The process of claim 4 or 6 wherein said gaseous material comprises carbon dioxide.

10. The process of claim 1 wherein said cake-forming components are fed to the mixing zone in the form of (1) a dry mix comprising:

| sugar | about 40 to about 60 parts by weight |
| flour | about 40 to about 60 parts by weight |
| sugar and flour | 100 parts by weight |
| baking powder | 0 to about 2.0 parts by weight |
| salt | 0 to about 1.5 parts by weight |
| cocoa | 0 to about 15 parts by weight |

(2) a liquid mix comprising:

| liquid whole egg | 100 parts by weight |
| vanilla extract | 0 to about 2% by weight of egg, and |

(3) water.

11. The process of claim 10, wherein said sugar in said dry mix is in crystalline form and said extruded batter contains crystalline sugar.

12. The process of claim 3 wherein said sugar comprises liquid sugar.

13. The process of claim 1, 6 or 10 wherein said microwave energy input is about 4 to about 8 kw min/lb of batter.

14. The process of claim 1, 6 or 10 wherein said temperature rise is to about 200° to about 212° F.

15. The process of claim 1, 6 or 10 wherein said microwave energy input is about 4 to about 8 kw min/lb. of batter, said temperature rise is to about 200° to about 212° F.

16. The process of claim 1 including drying the sponge cake resulting from said microwave baking step to a moisture content of about 3 to about 8 wt.%.

* * * * *